(12) United States Patent
Giallorenzi et al.

(10) Patent No.: US 7,760,697 B1
(45) Date of Patent: Jul. 20, 2010

(54) FAST AND LONG RANGE NODE DISCOVERY IN SPREAD SPECTRUM NETWORKS

(75) Inventors: Thomas R. Giallorenzi, Riverton, UT (US); Johnny M. Harris, Centerville, UT (US); Dan M. Griffin, Bountiful, UT (US); Richard B. Ertel, Midvale, UT (US); Eric K. Hall, Holliday, UT (US)

(73) Assignee: L-3 Communications Corporation, New York, NY (US)

( * ) Notice: Subject to any disclaimer, the term of this patent is extended or adjusted under 35 U.S.C. 154(b) by 906 days.

(21) Appl. No.: 11/136,789

(22) Filed: May 24, 2005

(51) Int. Cl.
*H04B 7/216* (2006.01)
*H04J 13/00* (2006.01)

(52) U.S. Cl. .................. 370/342; 370/479; 370/254; 379/141; 379/140; 379/142

(58) Field of Classification Search ............... 370/335, 370/503, 320, 328, 342, 338, 479, 254; 379/141, 379/140, 142
See application file for complete search history.

(56) References Cited

U.S. PATENT DOCUMENTS

| | | | | |
|---|---|---|---|---|
| 5,914,950 | A * | 6/1999 | Tiedemann et al. | 370/348 |
| 6,044,074 | A * | 3/2000 | Zehavi et al. | 370/350 |
| 6,163,533 | A * | 12/2000 | Esmailzadeh et al. | 370/342 |
| 6,269,085 | B1 * | 7/2001 | Provino et al. | 370/256 |
| 6,532,225 | B1 * | 3/2003 | Chang et al. | 370/341 |
| 6,728,225 | B1 * | 4/2004 | Ozluturk | 370/320 |
| 6,754,195 | B2 * | 6/2004 | Webster et al. | 370/335 |
| 7,065,373 | B2 * | 6/2006 | Rodgers et al. | 455/502 |
| 2002/0073223 | A1 * | 6/2002 | Darnell et al. | 709/232 |
| 2004/0156346 | A1 * | 8/2004 | O'Neill | 370/338 |
| 2004/0218533 | A1 * | 11/2004 | Kim et al. | 370/235 |
| 2005/0058121 | A1 * | 3/2005 | Santhoff et al. | 370/352 |
| 2005/0195770 | A1 * | 9/2005 | Baliga et al. | 370/335 |
| 2006/0172711 | A1 * | 8/2006 | King et al. | 455/101 |
| 2006/0227750 | A1 * | 10/2006 | Soltanian et al. | 370/335 |
| 2007/0092261 | A1 * | 4/2007 | Fan et al. | 398/158 |
| 2007/0211678 | A1 * | 9/2007 | Li et al. | 370/338 |
| 2007/0263628 | A1 * | 11/2007 | Axelsson et al. | 370/392 |

OTHER PUBLICATIONS

Yao, Y., et al., "A Two-Layer Spreading Code Scheme for Dual-Rate DS-CDMA Systems", IEEE Transactions on Communications, vol. 51, No. 6, Jun. 2003, p. 873-879.

* cited by examiner

*Primary Examiner*—Huy Phan
*Assistant Examiner*—Julio Perez
(74) *Attorney, Agent, or Firm*—Harrington & Smith (57) ABSTRACT

A first node seeking entry into a secure spread spectrum communications network sends a discovery burst at a low rate, and sends traffic bursts at a higher rate to exchange data rate for range. A receiving node receives discovery bursts via an omni-directional link and transmits and receives traffic bursts via directional links. As a node within the network detects a fading signal, it transmits a discovery burst at low rate on both its uplink and downlink channels. Other nodes may reply via the original uplink channel, and the fading node updates a list of candidate nodes through which it can relay through the network to its intended recipient by reversing the link direction of its original uplink and original downlink channels.

20 Claims, 8 Drawing Sheets

FAST AND LONG RANGE NODE DISCOVERY IN SPREAD SPECTRUM NETWORKS

CROSS-REFERENCE TO RELATED APPLICATIONS

This application is related to co-owned U.S. patent application Ser. Nos. 11/136,782 and 11/9136,943, filed the same date as this application. Those related applications are hereby incorporated by reference.

FIELD OF THE INVENTION

The present invention relates to signal acquisition, specifically, initiating and maintaining communications between a transmitter and receiver that may be moving relative to one another. It is particularly advantageous for spread spectrum communication systems, and can be used to extend a communication range between nodes of a network, whether established or entering that network.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the despreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different P/N codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two nodes' transmit and receive links to bring the initiating new node into the network. The transmitting and receiving links may occupy separate time slots in a time division duplex (TDD) system, or may be separate frequency bands in a frequency division duplex (FDD) system.

Figure 1:
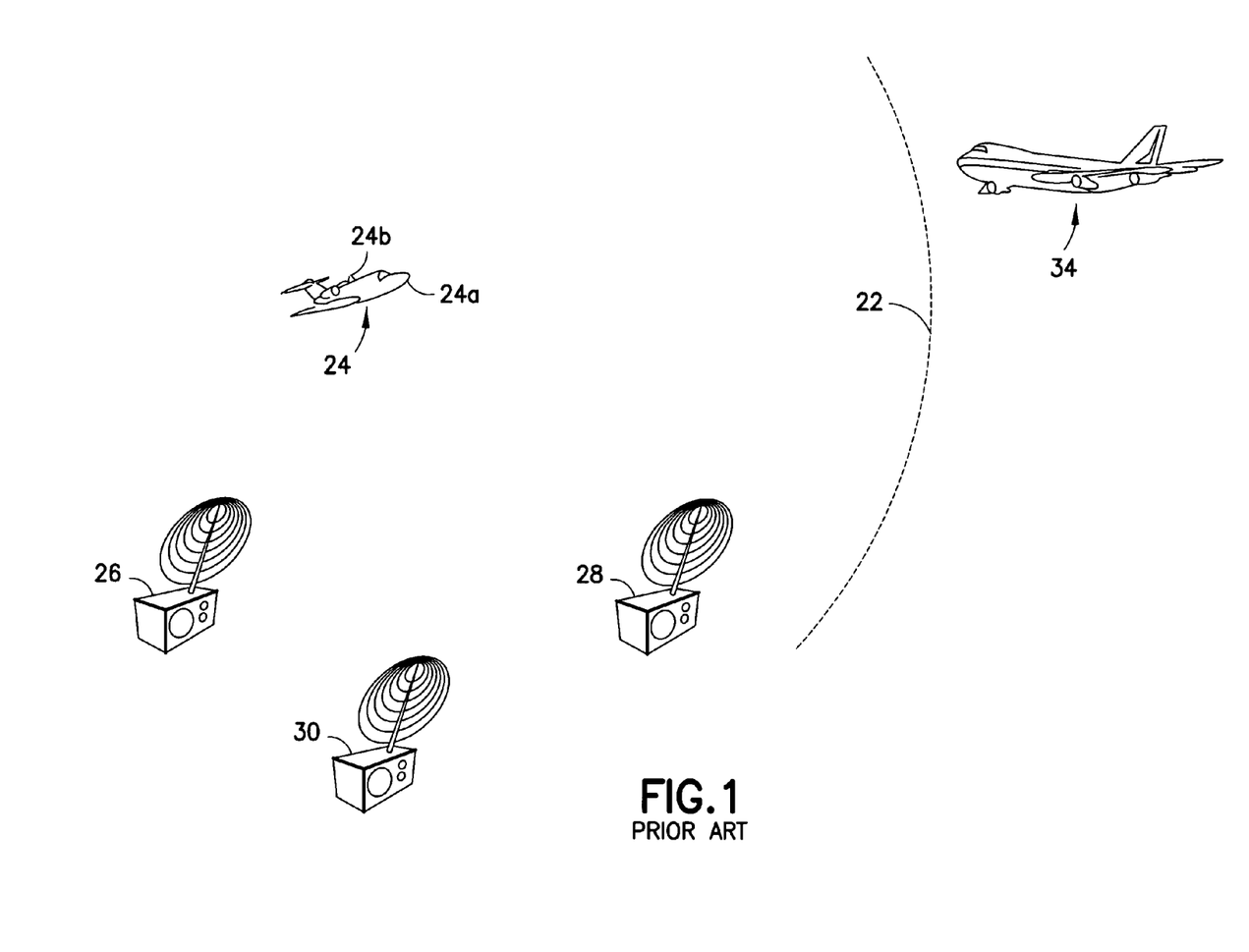
FIG. 1 is a schematic diagram of a particularly challenging prior art communication system in which a hailing node seeks entry into a communication network, and is an apt environment for the present invention.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft or satellite; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is generally centered on a command node 24. The range 22 is included to show further advantages of the invention that may be exploited when network communications are geographically limited.

The command node is representative of the node that receives the discovery burst, and may be a true command node that controls access to the secure network (in that no other nodes receive and acknowledge discovery bursts) or it may represent any node already established within the network that receives a discovery burst (such as where all established nodes listen for discovery bursts). In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28 or other moving nodes 30 already granted access to the network. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes.

Transmission bursts are normally divided into preamble and payload sections, payload carrying the substantive data and preamble to alert the intended recipient of the incoming payload. In a secure network, the preamble may be used to authenticate and grant access to the secure network, provided practical limitations as to real time signal processing for those functions can be accomplished with a high degree of reliability. As it is desirable to identify whether a hailing node 34 is to be allowed into the secure network as early as possible, directional antennas 24a (such as a rotatable dish antenna disposed in an aircraft nose cone) are typically used as they provide a longer range as compared to omni-directional antennas 24b (such as a fixed unipolar antenna protruding from an aircraft fuselage), all other factors being equal.

Two problems arise, one in establishing communications and one in maintaining them. First, the command node 24 may be scanning its directional antenna 24a in a quadrant that does not encompass the hailing node 34. Due to the high Doppler closure illustrated in FIG. 1, the hailing node 34 may be well within the (directional antenna 24a) range of the network when its discovery burst is first received at the command node 24. In a military environment, this puts friendly forces at increased risk unnecessarily for their lack of identification at the earliest possible moment. Second, when nodes are moving away form one another near the fringes of the omni-directional range (over which regular communications occur within the network), one fading node may switch to a directional antenna to extend the range of normal communications, but at a relatively high hardware cost of additional directional antennas for only a modest increase in range. There is an increasing need, in both business and military communications, for a highly secure network that extends over an area larger than that defined by a traditional range 22 (defined by a directional or omni-directional antenna). The present invention is directed to filling that need.

SUMMARY OF THE INVENTION

In accordance with one aspect, the present invention is a method of communicating with a node of a secure wireless network. In this aspect, the method includes transmitting a spread spectrum discovery burst at a first data rate. Following the discovery burst, the method includes transmitting a traffic burst at a second data rate that is greater than the first. In effect, this is trades data rate for range of the discovery burst.

In accordance with another aspect of the present invention is a method of communicating with a node of a secure spread spectrum wireless network. In this method, a discovery burst is sent at a low data rate and a traffic burst is sent at a high data rate so that the communication range of the discovery bursts is greater than a communication range of the traffic bursts.

Further in another aspect this invention is a transceiver for communicating on a spread spectrum secure wireless network. The transceiver has a transmitter for sending a discovery burst at a first rate and a traffic burst at a second rate that is greater than the first, and further has at least one antenna coupled to the transceiver. The at least one antenna is for sending the discovery burst over an omni-directional link and for sending the traffic burst over a directional link.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

DETAILED DESCRIPTION

Consider again FIG. 1. A hailing node 34 seeking entry into the network is unaware of the location of the command 24 or other nodes already communicating on the network. In a traditional network, the command node 24 uses its directional antenna 24a to sweep different quadrants or geographical segments in searching for unknown hailing nodes 34. That approach leads to delays in 'locking' onto hailing nodes and their discovery bursts due to the high potential Doppler shifts and phase noise in the illustrated network of FIG. 1. The present invention enables the command node 24 to lock onto a haling node discovery burst in milliseconds, while also using an omni-directional antenna 24b to avoid delays in first receiving the discovery burst. Further, the range of the omni-directional antenna 24b is greater in the present invention that that of the prior art, and in fact is also greater than that of the directional antenna 24a in a prior art communication system.

In a spread spectrum (e.g., CDMA) communication system, range is inversely related to throughput or data rate. Prior art secure networks employ a complex spreading code to increase security, but must necessarily use a high data rate to carry enough information for the receiver to resolve that high complexity spreading code with high reliability in a single discovery burst preamble. The present invention essentially 'trades' data rate in the reverse link (from hailing node 34 to command node 24) for range. This eliminates the need to extend range by use of a directional antenna 24a in the discovery burst acquisition phase of communications, and avoid the attendant difficulties of sweeping the antenna quickly enough so as not to forestall the advantages it is intended to gain. Using an omni-directional antenna 24b for discovery burst acquisition then entails a spreading code in the discovery burst preamble that is less complex, and purportedly less secure, than that of the prior art in order that reliable burst acquisition can be effected with high reliability.

In the basic network of FIG. 1, the effective range for exchange of discovery bursts may be extended beyond the prior art range (determined by a directional antenna 24a) by reducing the data rate of the discovery burst as compared to the prior art. Specifically, where traffic between nodes established in the secure network may be at, for example, 4 Mbps symbol rate, the discovery burst is transmitted at a lower data rate, for example, 1.6 kbps symbol rate using a 160 Mcps chip rate. As described in the references cited below, a 50 dB processing gain is achievable and has been demonstrated to enable this lower data rate over a greater range. This lowered data rate allows the command node 24 to use its omni-directional antenna 24b to search for discovery bursts over a range greater than that of the prior art (e.g., a burst at a data rate similar to that used by nodes already established on the network) with its directional antenna 24a, thus avoiding the problem of searching quadrants sequentially. Whereas the prior art (high data rate discovery burst and directional antenna sweep) may take between three and four minutes to acquire the hailing node, the present invention allows acquisition within milliseconds. Where the acquisition time is measured from the instant the hailing node crosses the range 22 as defined by the prior art, acquisition time for the present invention is actually negative, as it occurs prior to the hailing node reaching that range 22. For nodes established on the secure network, directional antennas may be used.

Alternatively and preferably, nodes may employ one or more phased array antennas that enable multiple directional links as well as one or more omni-directional link. An omni-directional link from the phased array antenna may be used for the discovery burst exchange (at the lower data rate), and the directional links may be used for normal traffic communications (at the higher data rate) with nodes already established on the network. These links may emanate from the same or different phased array antennas.

In the best mode as deemed by the inventors, the spreading code used in the discovery burst preamble is one described and claimed in co-owned and co-pending U.S. patent application Ser. No. 10/915,776 "Doped Multi-Rate Spread Spectrum Composite Codes", and more generally described and claimed in U.S. patent application Ser. No. 10/915,777 "Multi Rate Spread Spectrum Composite Codes". Each of those applications was filed on Aug. 10, 2004, and is incorporated by reference. The hailing and command nodes may communicate the discovery burst as described in co-owned and co-pending U.S. patent application Ser. No. 11/136,783, entitled "Method and Apparatus to Initiate Communication Between an Unknown Node and an Existing Secure Network", filed on May 24, 2005. The discovery burst preamble may contain information by which the command node/receiver can use to de-spread the payload signal (which is spread with a different spreading code as compared to that of the preamble) as described in co-owned and co-pending U.S. patent application Ser. No. 11/259,336, filed on Oct. 25, 2005. The command node/receiver may find and resolve the proper carrier and chip frequency of the discovery burst preamble as described in co-owned and co-pending U.S. patent application Ser. No. 11/9136,943, entitled "Method and Apparatus for Efficient Carrier Bin Search for a Composite Spreading Code", filed on May 24, 2005. The composite spreading code may be de-spread with any of the despreaders described in co-owned and co-pending U.S. patent application Ser. Nos. 10/915,776, 10/915,777, or alternatively in co-owned and co-pending U.S. patent application Ser. No. 11/136,782, entitled "Subsequence Accumulation Filter", filed on May 24, 2005. With the exception of U.S. patent application Ser. No. 11/259,336, each of the references cited in this paragraph are incorporated in their entirety, and further are deemed the best mode (or an alternative mode where noted) that is not necessarily limiting to the broader aspects of this present invention.

Figure 2A:
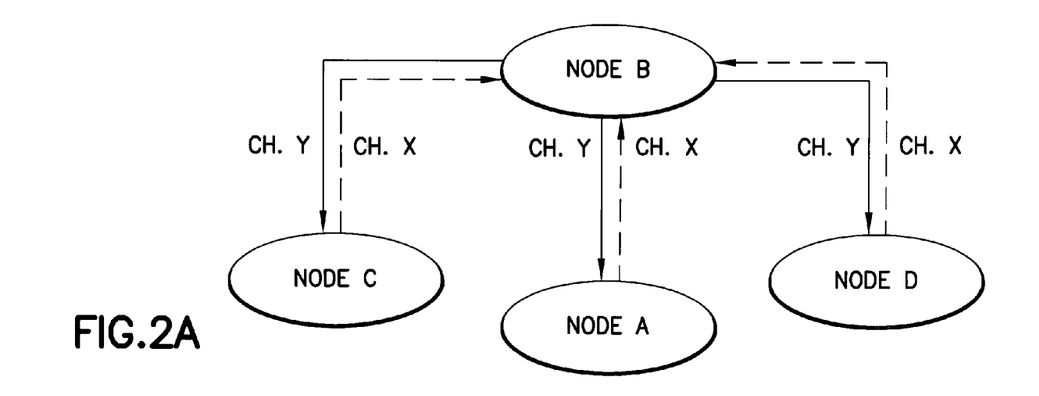
FIGS. 2A-2F show nodes in the network moving relative to one another and establishing new links to maintain contact on the secure network.

In the network of FIG. 1, nodes communicate directly with one another point to point. In addition to extending the range at which a hailing node's discovery burst is acquired, the present invention extends the range of nodes already established on the network. The concept is more particularly shown in FIGS. 2A-2F in a full duplex system. In FIG. 2A, node B (e.g., the command node 24 or network hub) receives on an uplink channel X from each of nodes A, C and D. The channel as used with reference to FIGS. 2A-F is preferably a spread spectrum channel or a series of sub-channels (e.g., OFDM), though it may be a fixed cyclic time slot such as in a TDMA system. Node B transmits messages on a downlink channel Y to each of nodes A, C and D. This alone is known in the art.

Assume that the nodes, once established and in continuous contact with one another over the secure network, communicate using a directional link of a phased array antenna, or with a directional antenna, as searching for other nodes via an antenna sweep is not an issue when the nodes' relative position is known. This allows the greatest range for high data rate traffic while on the network.

Figure 2B:
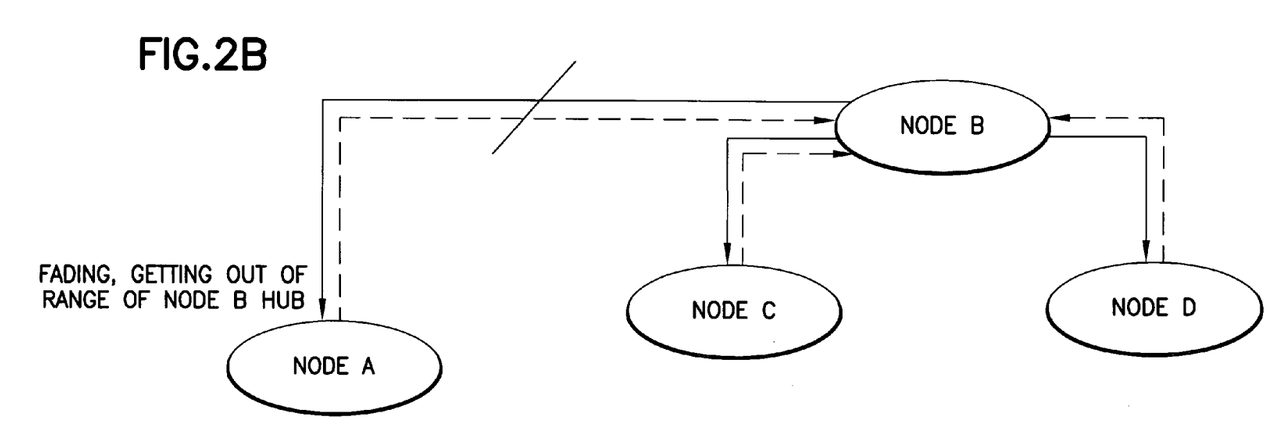

However, as with FIG. 1, the nodes may be moving relative to one another. In FIG. 2B, Node A is moving out of the normal network range of Node B, and its signals are fading. In accordance with the present invention and FIG. 2C, Node A sends a discovery burst (as described in the above incorporated references), on its original uplink channel X in seeking other nodes in the network. This discovery burst is preferably sent via an omni-directional link as Node A may not know the position of all other nodes in the network; it may communicate only with Node B and be unaware of Nodes C and D. As nodes C and D receive only on their downlink channel Y, they do not acquire the discovery burst on channel X and node A does not get a response except perhaps from node B, with whom its signal is already fading.

Figure 2C:
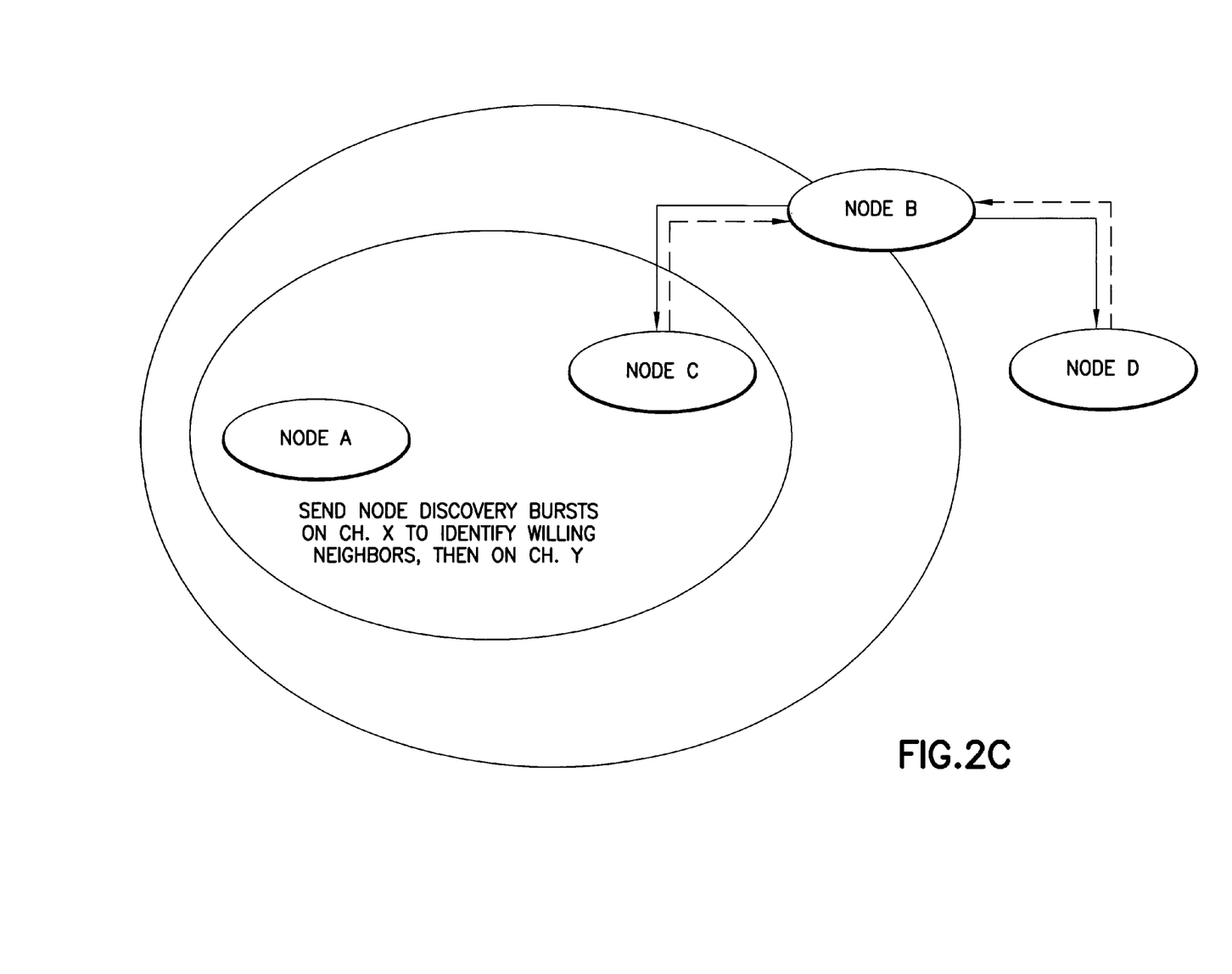

Node A then transmits a discovery burst on its previous downlink channel Y. Nodes C and D are already configured to receive on the downlink channel Y, and as shown in FIG. 2C, node C is within (omni-directional link) range. This range is extended as compared to a directional link/high data rate packet because the discovery burst is at a low data rate.

Figure 2D:
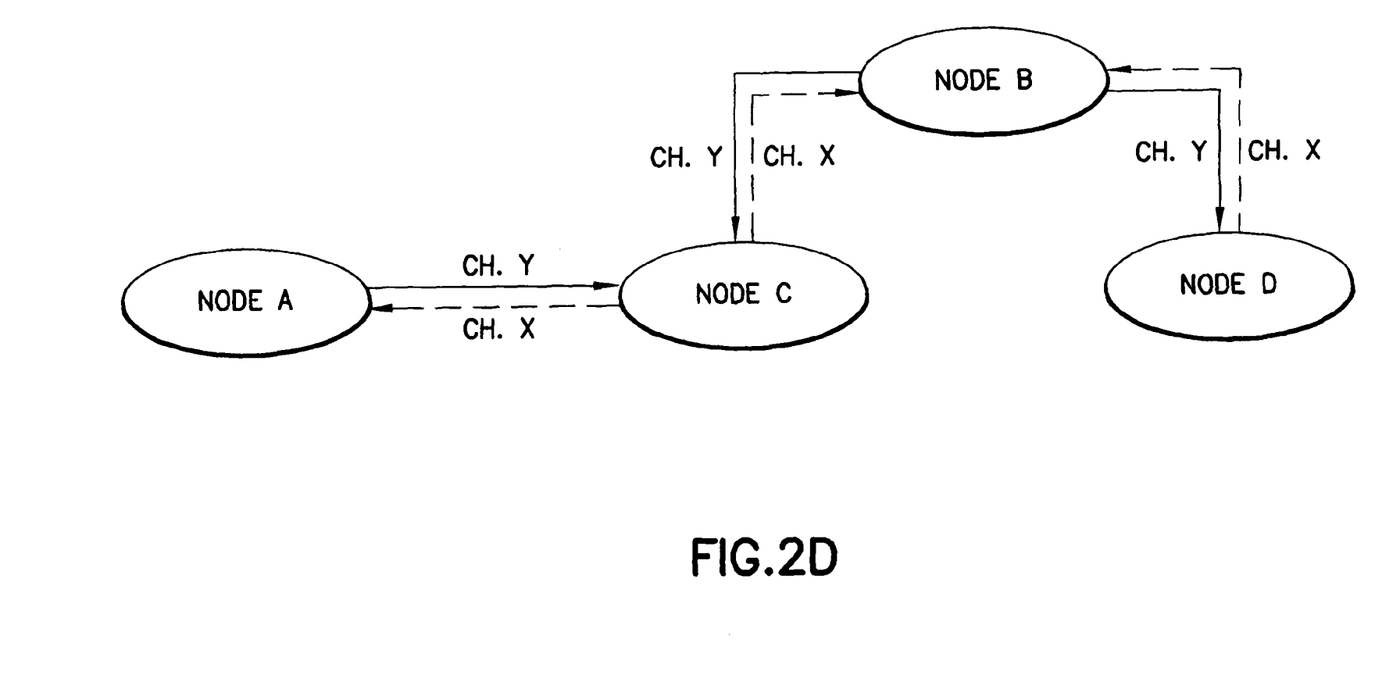

As depicted in FIG. 2D, Node C may acquire and validate the discovery burst by node A, allowing it access to the network itself. Preferably however, the discovery burst from node A on channel Y is received by node C and re-transmitted by node C to node B (the hub or command node 24) on node B's uplink channel X. Access to the network is granted to node A (assuming it was lost while fading from direct contact with node B) by node B via a downlink to node B on channel X that is retransmitted to node A on node C's downlink channel Y. Alternatively, access need not be granted if it communication was never severed between nodes A and B, and the discovery burst/response messages merely inform nodes A, B and C that communications between nodes A and B will hereafter be through node C. Now, nodes A and B use the same respective channels for uplink (channel Y) and downlink (channel X), and nodes C and D use the opposed respective channels for uplink (channel X) and downlink (channel Y).

Figure 2E:
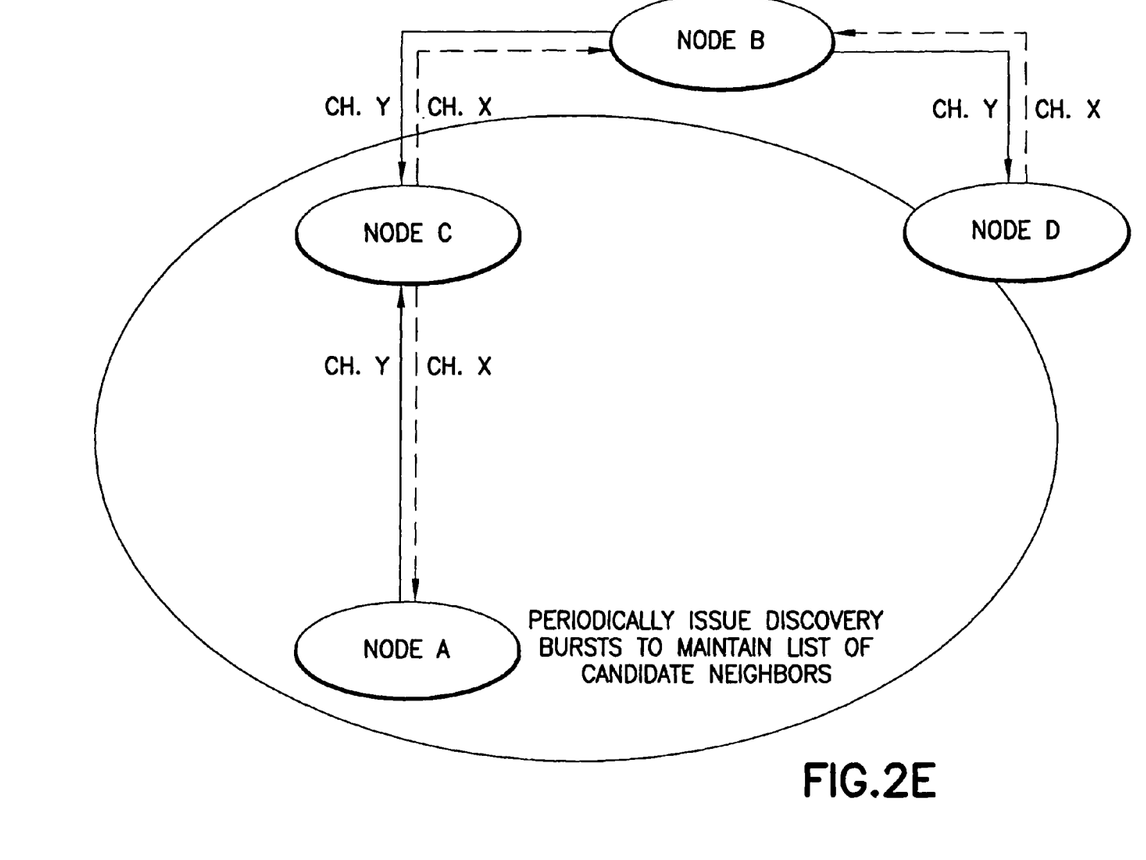

As shown in FIG. 2E, node A continues to move relative to other nodes in the network, and periodically sends a discovery burst to maintain a current list of candidate nodes that may serve as links to node B (the command node 24). These candidate nodes are each within the range of normal network communications (e.g., directional high rate links), and not necessarily all nodes that are within range of a discovery burst (omni-directional low rate links).

Figure 2F:
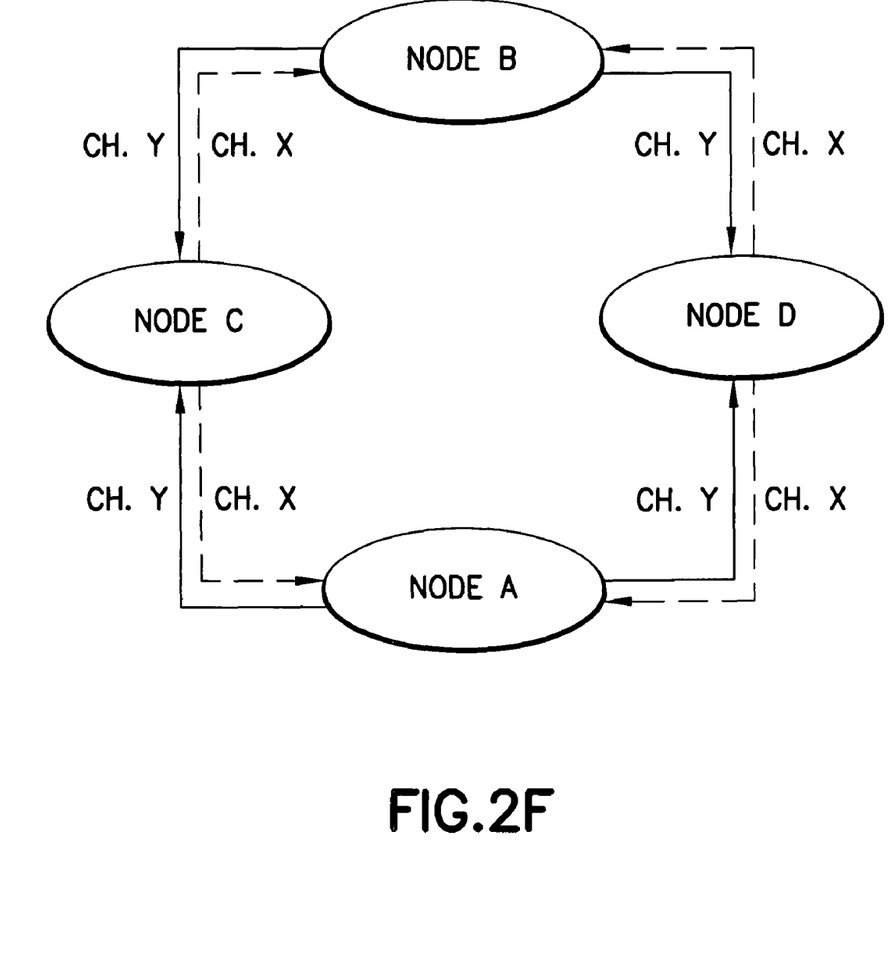

FIG. 2F shows that node A has moved further towards node D and has established (or is capable of establishing) normal traffic links with node D. The channels for uplink and downlink are as with node C. In this instance, either of nodes C or D may retransmit from node A to node B. As node A continues to move away from node C, node C will be dropped from the candidate list maintained by node B and communications with node B will be via node D.

Figure 3A:
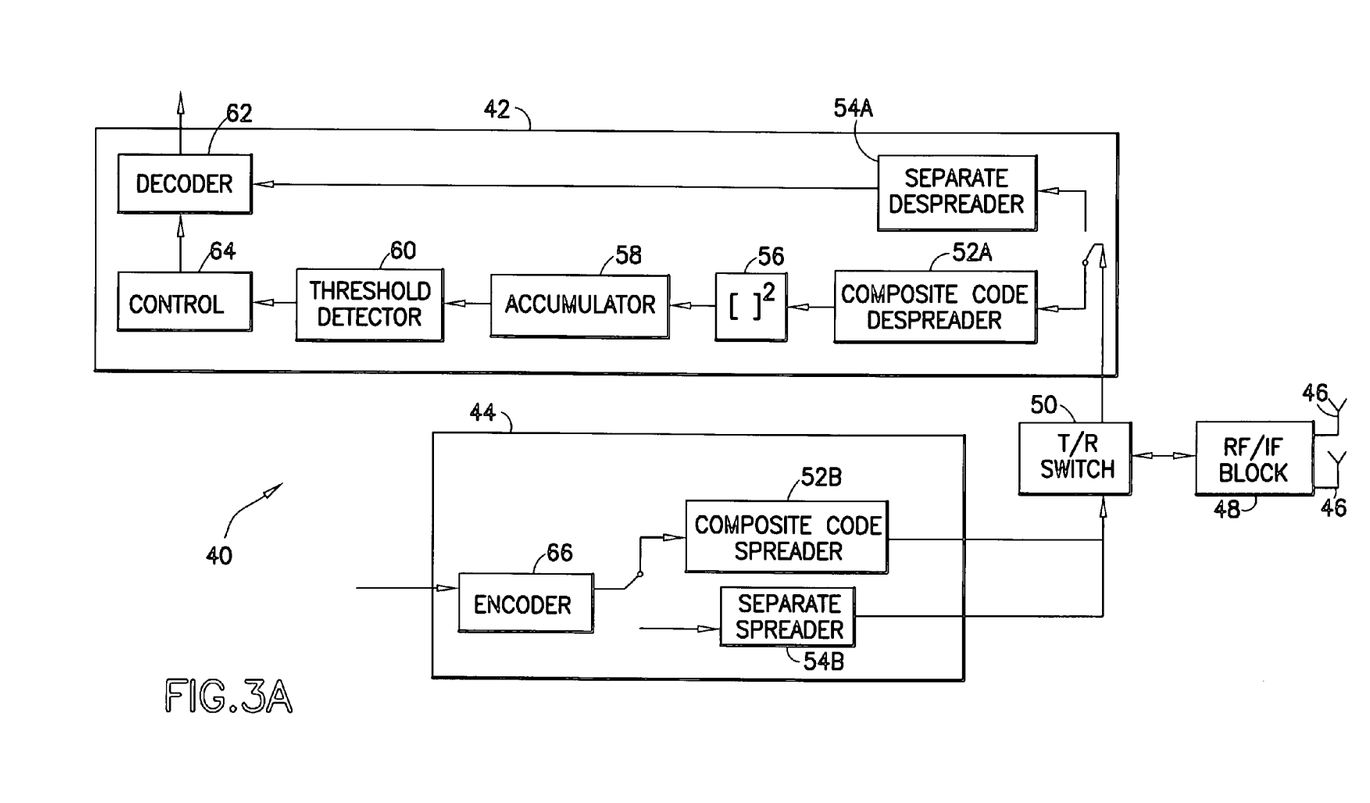
FIG. 3A is a block diagram of a TDD transceiver that incorporates aspects of the present invention according to a preferred embodiment of the present invention.

FIG. 3A shows a transceiver 40 according to a preferred embodiment of the present invention. The transceiver 40 includes a receiver portion 42 and a transmitter portion 44, and while separate functional blocks are shown for each, it is understood that the transmitter 44 and receiver 42 portions may share hardware represented by the functional blocks of FIG. 3A. At the receiver portion 42, a spread spectrum signal received at one or more antennas 46, preferably received at an omni-directional link of a phased array or an omni-directional antenna, is processed through a RF/IF block 48 and directed to the receive portion 42 via a transmit/receive switch 50. The RF/IF block is as known in the art, and may include, in order for received signals, a RF amplifier, a mixer, a local oscillator, a low pass filter, and an analog-to-digital converter. At the receive side 42, a preamble portion of a received discovery burst packet is despread at a composite despreader 52A, and a payload portion of that same packet is despread at a separate despreader 54A. Use of the term spreader and despreader does not imply a synchronized correlation. The composite despreader 52A despreads a composite spreading code as described in the incorporated references, and outputs to a squarer 56 and an accumulator 58. If energy in the accumulator 58 exceeds a threshold, the output passes through a threshold detector 60 and to a decoder 62. A control block 64 monitors the associated phase, code offset, and frequency or the received signal, and a search for the proper spreading code is either continued with a new P/N code from a list or stopped if the signal has been acquired with sufficient confidence as determined by a threshold detector 60.

The output from the separate despreader 54A bypasses the above processing blocks and passes into the decoder 62 in this preferred embodiment. The separate despreader may be according to the prior art or to any of the above-incorporated references, as compatible with the specific spreading code used in the payload section of the burst.

At the transmit side 44, a signal is encoded at an encoder 66 and a first portion, the portion that will become the preamble portion of a discovery burst, is spread by a composite despreader 52B. The portion of the encoded signal that is to be the payload portion is spread with a different spreading code by a separate despreader 54B. The two spread portions are combined into a single packet, passed through the T/R switch 50, amplified, converted to analog, and unconverted at the RF/IF block 48, and transmitted via at least one antenna 46, preferably an omni-directional antenna.

Figure 3B:
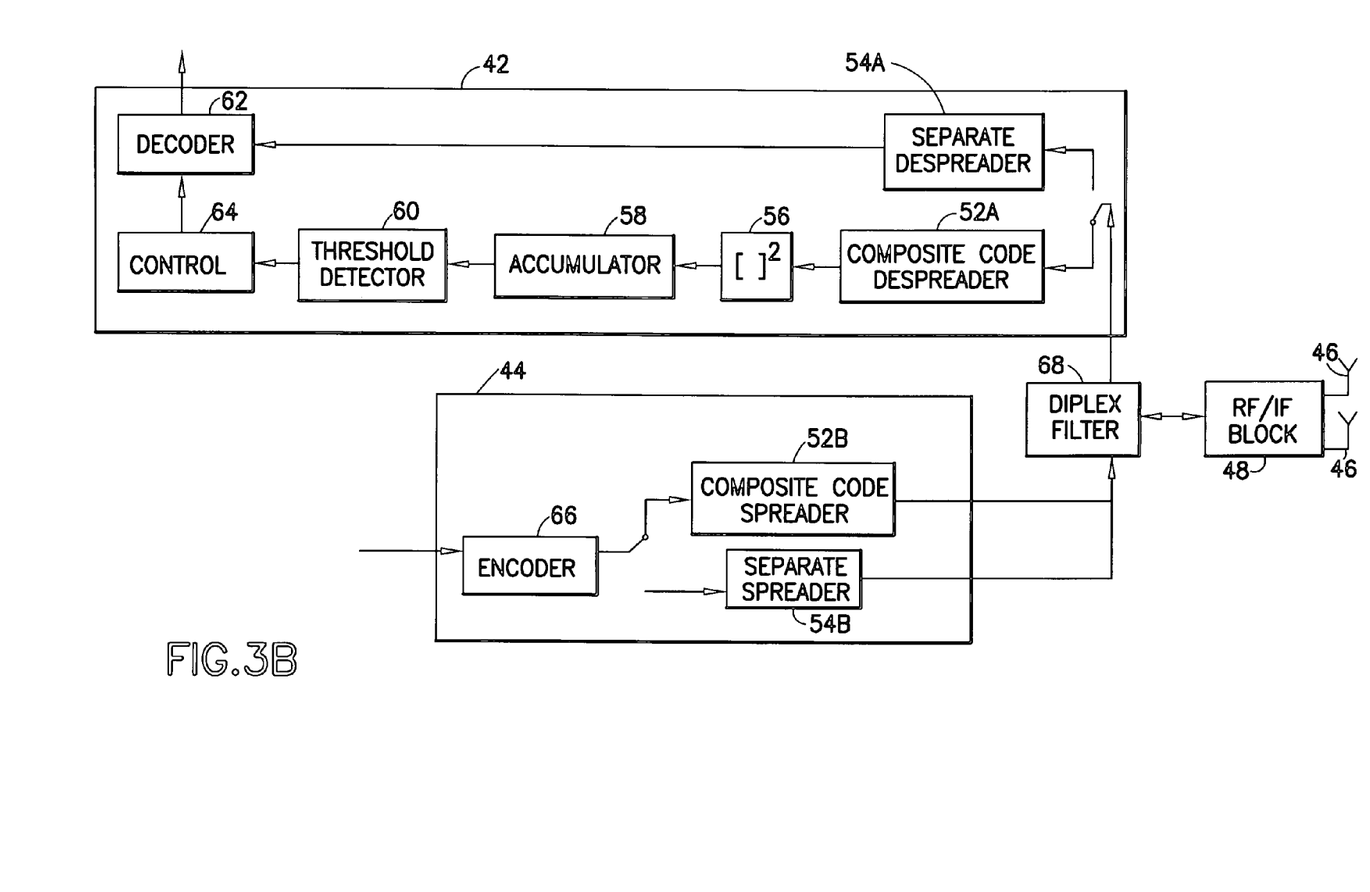
FIG. 3B is a block diagram similar to that of FIG. 3A, but of a FDD transceiver according to a preferred embodiment of the present invention.

FIG. 3B is similar to the transceiver of FIG. 3A, but showing a FDD (frequency division duplex) transceiver. The fundamental difference between FIGS. 3A and 3B is that in FIG. 3B, a diplex filter 68 replaces the T/R switch 50 to enable simultaneous transmission and reception. A preferred embodiment of a transceiver according to the present invention uses a diplex filter for FDD operation.

For transmitting and receiving traffic bursts once established on the secure communications network, the composite code spreader 54B and despreader 54A are not used in the preferred embodiment, the antenna(s) used are directional since the other nodes are known to the transceiver, and the rate is always higher for traffic bursts than for discovery bursts. The rate is generally determined at the encoder 66. Preferably, the traffic burst data rate is greater than about 4 Mbps and most preferably greater than about 200 Mbps; whereas preferably the discovery burst data rate is less than about 100 kbps and most preferably is on the order of about 1 kbps.

It is noted that the drawings and description presented herein are illustrative of the invention and not exhaustive. While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method of operating a first node in a communications network comprising:

communicating, by the first node, in a secure communications network with a second node by using a first channel X as an uplink channel and a second channel Y as a downlink channel;

transmitting, by the first node, a discovery burst on the second channel Y when it is determined that communications with the second node are fading; and receiving, at the first node, from a third node a grant of access to the secure communications network and re-establishing communications in the secure communications network through the third node using the first channel X as a downlink channel and the second channel Y as an uplink channel, wherein after sending to the first node the grant of access, the third node operates as relay between the second node and the first node by: relaying traffic that is received from the first node on the second channel Y to the third node on the first channel X and relaying traffic that is received from the third node on the second channel Y to the first node on the first channel X.

2. The method of claim 1, wherein the first node sends traffic on the first channel X as an uplink channel when communicating in the secure communications network, and then on the second channel Y as an uplink channel after re-establishing communications in the secure communications network, at a data rate that is at least ten times greater than a data rate at which the first node sends the discovery burst.

3. The method of claim 1, wherein the discovery burst comprises a preamble and a payload, wherein the preamble contains information for use in despreading the payload.

4. The method of claim 1, wherein transmitting the discovery burst on the second channel Y is via an omnidirectional antenna and wherein the secure communications network is a full duplex system.

5. The method of claim 1, where the grant is by the second node and received at the first node from the third node, where the second node operates as a hub of the secure communications network.

6. A method of operating a third node in a secure communications network comprising:
communicating, by the third node, in a secure communications network with a second node by using a first channel X as an uplink channel and a second channel Y as a downlink channel;
receiving, at the third node, a discovery burst on the second channel Y as a downlink from a first node; and
sending, by the third node, to the first node a grant of access to the secure communications network on the first channel X while maintaining secure communications with the second node using the first channel X as an uplink channel and the second channel Y as a downlink channel, wherein after sending to the first node the grant of access, the third node operates as relay between the second node and the first node by: relaying traffic that is received from the first node on the second channel Y to the third node on the first channel X and relaying traffic that is received from the third node on the second channel Y to the first node on the first channel X.

7. The method of claim 6, wherein the received discovery burst is at a data rate that is at most one tenth a data rate that the third node uses for traffic it sends on the first channel X as an uplink channel when communicating in the secure communications network.

8. The method of claim 6, wherein after receiving the discovery burst on the second channel Y, the third node forwards the discovery burst on the first channel X to the second node which operates as network hub for the secure communications network and thereafter the third node receives the grant of access from the network hub on the second channel Y and forwards the grant of access to the first node on the first channel X.

9. The method of claim 6, wherein the discovery burst comprises a preamble and a payload, wherein the preamble contains information for use in despreading the payload.

10. The method of claim 9, wherein the third node decodes the discovery burst and sends the grant of access autonomously of the second node.

11. The method of claim 6, further comprising configuring at least a third node to communicate with at least one of the first node and the second node.

12. A radio node for communicating on a spread spectrum secure wireless network comprising:
at least one transceiver configured to communicate in a secure communications network with a second node by using a first channel X as an uplink channel and a second channel Y as a downlink channel;
the at least one transceiver configured to transmit a discovery burst on the second channel Y when it is determined that communications with the second node are fading; and
the at least one transceiver configured to receive from a third node a grant of access to the secure communications network and to re-establish communications in the secure communications network through the third node using the first channel X as a downlink channel and the second channel Y as an uplink channel, wherein after sending to the at least one transceiver the grant of access, the third node operates as relay between the second node and the at least one transceiver by: relaying traffic that is received from the at least one transceiver on the second channel Y to the third node on the first channel X and relaying traffic that is received from the third node on the second channel Y to the at least one transceiver on the first channel X.

13. The radio node of claim 12, wherein the at least one transceiver is configured to send traffic on the first channel X as an uplink channel when communicating in the secure network, and then on the second channel Y as an uplink channel after re-establishing communications in the secure communications network, at a data rate that is at least ten times greater than a data rate at which it sends the discovery burst.

14. The radio node of claim 12, wherein the discovery burst comprises a preamble and a payload, wherein the preamble contains information for use in despreading the payload.

15. The radio node of claim 12, further comprising an omnidirectional antenna from which is transmitted the discovery burst on the second channel Y, and wherein the secure communications network is a full duplex system.

16. The radio node of claim 12, wherein the grant of access is by the second node and is received at the radio node from the third node, where the second node operates as a hub of the secure communications network.

17. A third radio node in a secure communications network comprising:
at least one transceiver configured to communicate in a secure communications network with a second node by using a first channel X as an uplink channel and a second channel Y as a downlink channel;
the at least one transceiver configured to receive a discovery burst on the second channel Y as a downlink from a first node; and
the at least one transceiver configured to send to the first node a grant of access to the secure communications network on the first channel X while maintaining secure communications with the second node using the first channel X as an uplink channel and the second channel Y as a downlink channel, wherein after sending to the first node the grant of access, the third node is configured to operate as relay between the second node and the first node by relaying traffic that is received from the first node on the second channel Y to the third node on the first channel X and by relaying traffic that is received from the third node on the second channel Y to the first node on the first channel X.

18. The third radio node of claim 17, wherein after receiving the discovery burst on the second channel Y, the third node is configured to forward the discovery burst on the first channel X to the second node which operates as network hub for the secure communications network and thereafter the third node is configured to receive the grant of access from the network hub on the second channel Y and to forward the grant of access to the first node on the first channel X.

19. The third radio node of claim 17, wherein the discovery burst comprises a preamble and a payload, wherein the preamble contains information for use in despreading the payload.

20. The third radio node of claim 17, wherein at least a third node is configured to communicate with at least one of the first node and the second node.

* * * * *